No. 816,400. PATENTED MAR. 27, 1906.
R. J. TAYLOR.
FERTILIZER DISTRIBUTER.
APPLICATION FILED OCT. 12, 1905.

Witnesses:
O. J. Belt
L. E. Moncy

Inventor.
Richard J. Taylor,
By W. H. Wills,
Attorney.

UNITED STATES PATENT OFFICE.

RICHARD J. TAYLOR, OF COMO, NORTH CAROLINA.

FERTILIZER-DISTRIBUTER.

No. 816,400.  Specification of Letters Patent.  Patented March 27, 1906.

Application filed October 12, 1905. Serial No. 282,447.

*To all whom it may concern:*

Be it known that I, RICHARD J. TAYLOR, a citizen of the United States, residing at Como, in the county of Hertford and State of North Carolina, have invented certain new and useful Improvements in Fertilizer-Distributers, of which the following is a specification.

This invention relates to fertilizer-distributers, and particularly to the class of wheeled or sulky machines employing feed-rollers revolved by a shaft operated by the wheel-axle and having swinging chutes.

The invention consists in the novel construction and peculiar arrangement of the several parts for hanging and swinging the chutes.

Figure 1:
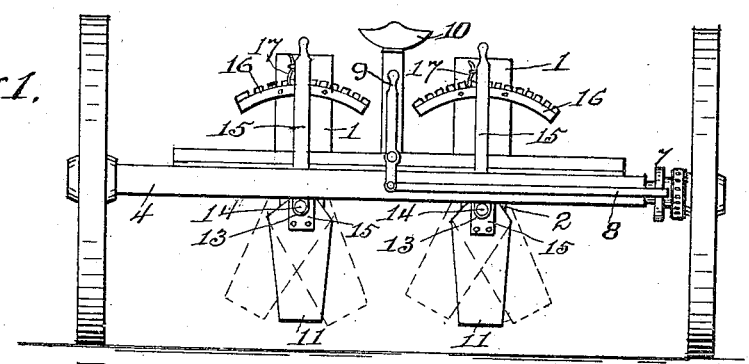
Figure 2:
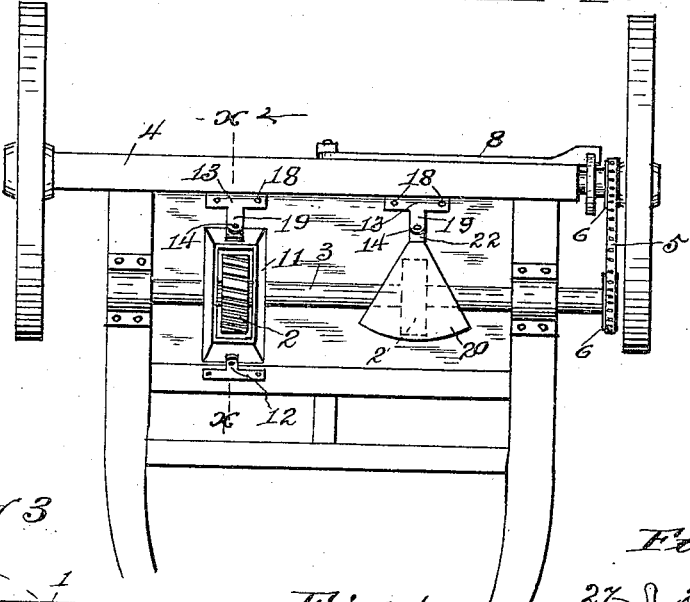
Figure 3:
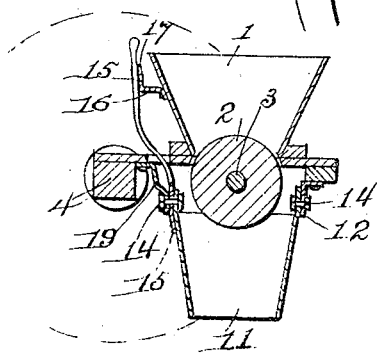
Figure 4:
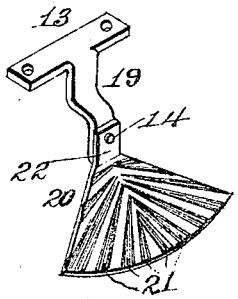
Figure 5:
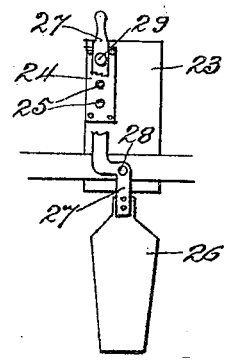

In the accompanying drawings, forming part of this application, Figure 1 is a rear end view showing in dotted lines the movable positions of the chutes. Fig. 2 is a bottom plan view showing a spreader and a chute attached. Fig. 3 is a section on the line $x\ x$, Fig. 2. Fig. 4 is a perspective view of a hanger with spreader attached. Fig. 5 is a rear view showing modified means for adjusting the chutes.

The same numeral references denote the same parts throughout the several views of the drawings.

The sulky is provided with suitable hoppers 1, under each of which is revolved a feed-roller 2, mounted on a shaft 3, driven by the axle 4 by means of chain 5 and sprockets 6, said shaft being thrown in and out of action by means of a coupling 7, operated by a slide-bar 8, controlled by a hand-lever 9 from a driver's seat 10. The said rollers have suitable corrugations or grooves for feeding fertilizer from the hoppers.

The chutes 11 have their front end pivoted in an ear 12, depending from the sulky-frame, the rear end of the chutes being hung from hangers 13, to which they are pivoted by bolts 14. The rear end of each chute is provided with an adjusting-lever 15, a rack 16, and a pawl 17, said levers being operated to work the chutes on their pivots, so as to place them at various desired angles.

The hangers 13 are preferably T-shaped and are secured to the sulky-frame by bolts 18 and have an inwardly and downwardly projecting stem 19, to which the chutes are pivoted. The hangers 13 are designed to have spreaders 20 secured thereto by the bolts 14 instead of the chutes, said spreaders having grooves 21 radiating from an ear 22 to the edge of the spreaders, and the latter are positioned on an incline under the feed-rollers, so as to scatter land-lime or fertilizer broadcast.

It is obvious that the chutes may be swung or adjusted according to the width of field-rows by simply working the levers 15, or they may be set to hang vertically, as occasion may demand.

Referring to the modification shown in Fig. 5, the hopper 23 is provided with a plate 24, having apertures 25. The chute 26 has a lever 27 secured thereto, said lever being pivoted at 28 and provided with a set-pin 29, adapted to engage the apertures 25 in the vertical adjustment of the lever to swing the chute.

Having thus described my invention, what I claim as new, and desire to secure by Letters Patent, is—

In a fertilizer-distributer, the combination, with a sulky-frame, pivot-ears depending from the frame, the hoppers, a toothed rack secured to the back of each hopper, and the T-shaped hangers, of the chutes pivoted in said ears and each having a pivot-bolt connection with the hangers, a separate and independent hand-lever attached to each chute and having said bolts extending therethrough, and a pawl carried by each lever to hold the chutes in independent lateral adjustment.

In witness whereof I hereunto set my hand in the presence of two witnesses.

RICHARD J. TAYLOR.

Witnesses:
 G. C. PICOT,
 S. P. WINBORNE.